United States Patent
Comstock et al.

(10) Patent No.: US 9,843,972 B2
(45) Date of Patent: Dec. 12, 2017

(54) INCREMENTAL COMPENSATION CELL EXPANSION DURING COMMUNICATIONS SYSTEM RADIO COVERAGE RECONFIGURATION

(71) Applicant: Kyocera Corporation, Kyoto (JP)

(72) Inventors: David Comstock, San Diego, CA (US); Katsuhiro Mitsui, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/022,793

(22) PCT Filed: Sep. 29, 2014

(86) PCT No.: PCT/US2014/058099
§ 371 (c)(1),
(2) Date: Mar. 17, 2016

(87) PCT Pub. No.: WO2015/048669
PCT Pub. Date: Apr. 2, 2015

(65) Prior Publication Data
US 2016/0234743 A1    Aug. 11, 2016

Related U.S. Application Data

(60) Provisional application No. 61/883,944, filed on Sep. 27, 2013, provisional application No. 61/934,585, filed on Jan. 31, 2014.

(51) Int. Cl.
*H04W 36/00* (2009.01)
*H04W 36/16* (2009.01)
(Continued)

(52) U.S. Cl.
CPC ..... *H04W 36/165* (2013.01); *H04W 36/0083* (2013.01); *H04W 52/0203* (2013.01);
(Continued)

(58) Field of Classification Search
CPC ........... H04W 36/0083; H04W 36/165; H04W 52/0203; H04W 52/0206; Y02B 60/50
(Continued)

(56) References Cited

U.S. PATENT DOCUMENTS

2010/0056150 A1    3/2010   Mooney et al.
2010/0240373 A1    9/2010   Ji et al.
(Continued)

FOREIGN PATENT DOCUMENTS

JP    2010-283440 A    12/2010
WO   WO 2012-127325 A2    9/2012

OTHER PUBLICATIONS

Kyocera Corp.; "Energy saving scenario for LTE coverage layer", R3-131473; 3GPP TSG RAN WG3 Meeting #81; Aug. 10, 1013; Barcelona, Spain.
(Continued)

*Primary Examiner* — Timothy Pham

(57) ABSTRACT

In a cellular communication system, a coverage area configuration transition includes incrementally expanding a compensation service area to include at least a portion of an area covered by the energy saving service area. For example, the compensation service area can be expanded to cover a first cell edge of an energy saving service area, and any UE devices located within the first cell edge can be handed over to the compensation service area. After the UE devices in the first cell edge are handed over, the energy saving service area can be reduced such that a second cell edge is created. The process of handing over the additional UE devices to the compensation service area and reducing the energy saving service area can be repeated as many times as necessary to handover all of the UE devices being served by the energy saving service area.

19 Claims, 6 Drawing Sheets

(51) Int. Cl.
    *H04W 52/02*      (2009.01)
    *H04W 16/00*      (2009.01)
(52) U.S. Cl.
    CPC ........ *H04W 52/0206* (2013.01); *H04W 16/00* (2013.01); *Y02B 60/50* (2013.01)
(58) Field of Classification Search
    USPC ........................................................ 455/438
    See application file for complete search history.

(56) References Cited

U.S. PATENT DOCUMENTS

| | | | |
|---|---|---|---|
| 2012/0087247 A1 | 4/2012 | Min et al. | |
| 2012/0270553 A1* | 10/2012 | Ha | H04W 36/22 455/438 |
| 2013/0225167 A1 | 8/2013 | Tokgoz et al. | |
| 2015/0031369 A1* | 1/2015 | Gunnarsson | H04W 36/04 455/438 |
| 2016/0057666 A1* | 2/2016 | Pang | H04W 24/10 370/252 |

OTHER PUBLICATIONS

Kyocera Corp.; Resource management for LTE coverage layer energy saving scenario, R3-131475; 3GPP TSG RAN WG3 Meeting #81;August 10, 1013;Barcelona, Spain.

\* cited by examiner

INCREMENTAL COMPENSATION CELL EXPANSION DURING COMMUNICATIONS SYSTEM RADIO COVERAGE RECONFIGURATION

PRIORITY CLAIM

The present application claims priority to Provisional Application No. 61/883,944, entitled "Methods for Managing Transitions Between Cell Coverage Configurations in a Mobile Network", filed Sep. 27, 2013, and to Provisional Application No. 61/934,585, entitled "Methods For Managing Interference During Dynamic Cell Coverage Configuration Transitions", filed Jan. 31, 2014, both assigned to the assignee hereof, and hereby expressly incorporated by reference.

FIELD

The invention disclosed herein generally relates to wireless communications and more particularly to apparatuses, systems, and methods for incrementally expanding a compensation cell during a communications systems radio coverage reconfiguration.

BACKGROUND

Many wireless communication systems employ transceiver stations or radio heads to provide service within geographical service areas, where the boundaries of a service area are determined by the radio coverage of its associated transceiver station. Wireless service is provided to user equipment (UE) devices over radio frequency carriers (carriers) within each service area, where a carrier is the modulated waveform that conveys the physical channels as specified by the associated wireless technology standard. These service areas are sometimes referred to as "cells".

Although the term "cell" sometimes refers to the geographical area where multiple uplink and downlink resources (e.g., pairs of uplink and downlink carriers) are used, increasingly the term "cell" is used to refer to the geographical service area where a single uplink resource and a single downlink resource are used to communicate with the UE devices. For example, where Time Division Duplex (TDD) is used, a single frequency channel is used within the cell and uplink and downlink channels are allocated different time periods. Where Frequency Division Duplex (FDD) is used, a single uplink/downlink frequency channel pair (one uplink frequency channel and one downlink frequency channel) is used within a "cell".

As discussed herein, one or more resources (carrier pairs) may be used in a service area. As a result, a service area may be a single cell or may contain multiple cells. In one common arrangement, each service area is adjacent to several other service areas to provide ubiquitous coverage over a large geographical area.

Adjacent service areas may overlap slightly, but, for the following discussion, no service areas provide service within the same geographical area. In many situations, there may be an advantage to dynamically change the configuration of the service areas, such as by selectively reducing the size of some service areas and expanding the size of one or more other service areas to provide service within the area previously serviced by the service areas that were reduced. Such dynamic coverage area configuration transitions may allow for more efficient operation of the system.

For example, a service area with only a small number of UE devices may be reduced to zero by deactivating its associated transceivers, and an adjacent service area that is serving several UE devices but has available capacity may be expanded to provide radio coverage for the UE devices previously contained in the reduced service area. Therefore, a service area that is reduced may be referred to as an energy saving service area since the energy consumed by its associated transceivers is reduced or eliminated, and a service area that is reduced to zero may be referred to as a deactivated service area. A service area that is expanded in cooperation with a service area that is reduced may be referred to as compensation service area since its service area is expanded to compensate for a service area that is reduced.

UE devices being served by an energy saving service area will lose their connection with the network if they are not handed over to another service area before the energy saving service area is deactivated. If the energy saving service area and the compensation service area operate on the same frequency resources, UE devices being served by an energy saving service area may lose their connection with the network if the compensation service area is expanded before the UE devices are handed over to another service area because of the interference between the energy saving service area radio transmissions and the compensation service area radio transmissions. As discussed below, management techniques are needed to control the dynamic coverage area configuration transitions.

SUMMARY

In a cellular communication system, a coverage area configuration transition is performed when it is determined that the resources allocated to a compensation service area have sufficient available capacity to serve one or more UE devices being served by an energy saving service area. In reconfiguring service areas of the system that operate on the same frequency resources, the compensation service area (e.g., compensation communication station coverage area) is incrementally expanded such that for each incremental stage, the compensation service area is expanded to include at least a portion of an area covered by the energy saving service area, one or more UE devices being served by the energy saving service area are handed over to the compensation service area, and a portion of the energy saving service area is reduced. The size of the portion of an area covered by the energy saving service area that is included in the expanded compensation service area may be restricted by the interference between the radio transmissions of the two service areas in order to allow UE devices being served by the energy saving service area to detect the radio transmissions of both service areas. The size of the portion of the energy saving service area that is reduced may be restricted such that UE devices being served by the energy saving service area avoid losing their connection with the network due to a radio link failure. For example, the compensation service area can be expanded by a first increment to include a first cell edge of an energy saving service area, and any UE devices located within the first cell edge can be handed over to the compensation service area that is provided by the compensation communication station. After the UE devices in the first cell edge are handed over, the energy saving service area can be reduced by an increment such that a second cell edge is created.

If the resources allocated to the compensation service area have sufficient available capacity to serve one or more additional UE devices located in the second cell edge, the process of expanding the compensation serving area by an increment, handing over the additional UE devices to the compensation service area and reducing the energy saving service area by an increment can be repeated. The entire process can be repeated as long as the energy saving service area is still serving additional UE devices and the resources allocated to the compensation service area have sufficient available capacity to serve the UE devices located in the energy saving service area cell edge and the entire process may be repeated as many times as necessary to handover all of the UE devices being served by the energy saving service area so that the energy saving communication station may be deactivated or switched off.

DETAILED DESCRIPTION

In a cellular communication system, a coverage area configuration transition is performed when it is determined that the resources allocated to a compensation service area have sufficient available capacity to serve one or more UE devices being served by an energy saving service area. In reconfiguring service areas of the system that operate on the same frequency resources, the compensation service area (e.g., compensation communication station coverage area) is incrementally expanded such that for each incremental stage, the compensation service area is expanded to include at least a portion of an area covered by the energy saving service area, one or more UE devices being served by the energy saving service area are handed over to the compensation service area, and a portion of the energy saving service area is reduced. The size of the portion of an area covered by the energy saving service area that is included in the expanded compensation service area may be restricted by the interference between the radio transmissions of the two service areas in order to allow UE devices being served by the energy saving service area to detect the radio transmissions of both service areas. The size of the portion of the energy saving service area that is reduced may be restricted such that UE devices being served by the energy saving service area avoid losing their connection with the network due to a radio link failure. For example, the compensation service area can be expanded by a first increment to include a first cell edge of an energy saving service area, and any UE devices located within the first cell edge can be handed over to the compensation service area that is provided by the compensation communication station. After the UE devices in the first cell edge are handed over, the energy saving service area can be reduced by a first increment such that a second cell edge is created.

If the resources allocated to the compensation service area have sufficient available capacity to serve one or more additional UE devices located in the second cell edge, the process of expanding the compensation serving area by an increment, handing over the additional UE devices to the compensation service area and reducing the energy saving service area by an increment can be repeated. The entire process can be repeated as long as the energy saving service area is still serving additional UE devices and the resources allocated to the compensation service area have sufficient available capacity to serve the UE devices located in the energy saving service area cell edge, and the entire process may be repeated as many times as necessary to handover all of the UE devices being served by the energy saving service area so that the energy saving communication station may be deactivated or switched off.

Figure 1B:
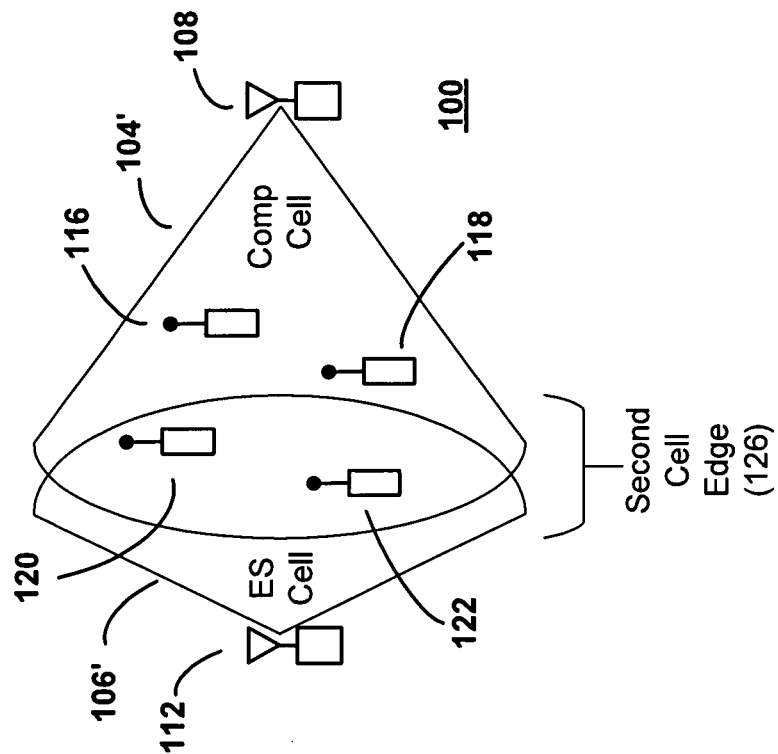
FIG. 1B is an illustration of coverage areas in a cellular communication system after the compensation cell has been expanded by an increment.
Figure 1A:
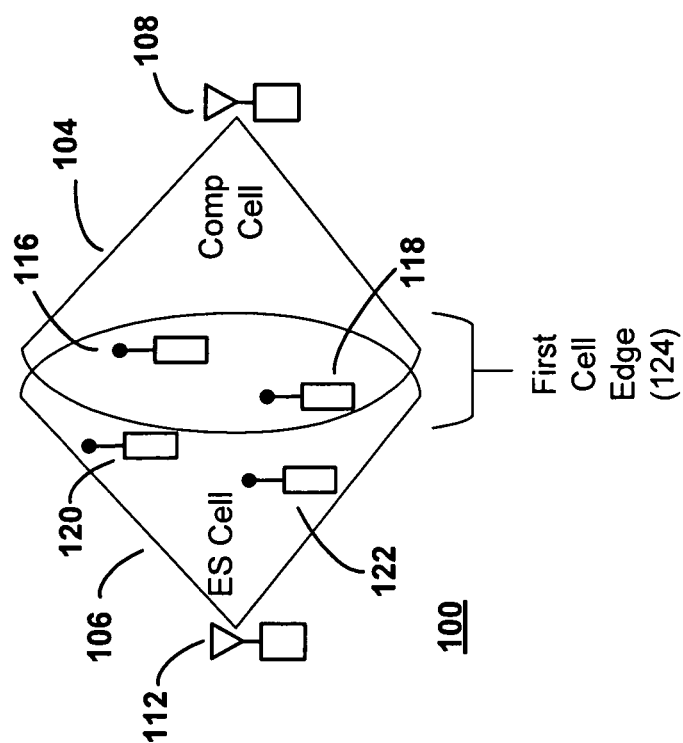
FIG. 1A is an illustration of coverage areas in a cellular communication system before the compensation cell is expanded.

FIG. 1A is an illustration of coverage areas in a cellular communication system 100 before the compensation cell is expanded. For the example of FIG. 1A, an energy saving communication station 112 provides wireless service within a geographical service area, a portion of which is shown by energy saving cell (ES Cell) 106. Although energy saving communication station 112 is shown as only providing one cell, it should be understood that, in other instances, energy saving communication station 112 can provide additional cells besides the energy saving cell 106. FIG. 1A also shows a compensation communication station 108 that provides wireless service within a geographical service area, a portion of which is shown by compensation cell (Comp Cell) 104. Similar to the energy saving communication station 112, the compensation communication station 108 is shown as only providing one cell, even though the compensation communication station 108 is capable of providing additional cells besides the compensation cell 104.

The pie-slice shapes representing the service areas of the cells generally illustrate the relationships between the cells and do not necessarily depict the actual shapes of the service areas. The coverage area configuration transition management techniques discussed with reference to FIGS. 1A and 1B may be applied to numerous coverage area configuration transition scenarios. For example, several energy saving cells may be deactivated and a compensation cell may be expanded to cover the geographical service areas of the multiple energy saving cells in accordance with the techniques discussed herein. The cells may have any of several shapes and sizes. In FIG. 1A, the compensation service area and the energy saving service area overlap, which illustrates a typical operating scenario where UE devices are able to detect at least two cells at the same time and that allows UE devices to handover to a cell before losing connection with its serving cell.

Communication stations 108, 112 transmit and receive wireless signals to provide the cells 104, 106. Each communication station 108, 112, which also may be referred to as an access node, access point, eNodeB, eNB, base station, and other terms, includes a transceiver, or radio head and station controller. The controller in each communication station is configured to perform the various methods and operations described herein. The transceiver, or radio head, may be collocated with the station controller although the station controller may be physically separated from the radio head.

The radio head at least includes radio frequency (RF) transceiver equipment such as antennas, transmitters, and receivers, for transmitting and receiving wireless signals. Typically, radio heads do not include higher level processing and control functions which are performed by the associated station controller. For the illustration of FIGS. 1A and 1B, the radio heads are near a station controller where both the radio head and the controller may be implemented within a single apparatus. Since the location, shape, and size of the cell is determined at least in part by wireless transmission and reception with the communication station, the cell's location and coverage area is determined by the location and operation of the radio head.

The compensation communication station 108 provides the compensation cell 104, and an energy saving communication station 112 provides the energy saving cell 106. In FIG. 1A, energy saving communication station 112 provides wireless communication services to wireless communication user equipment devices (UE devices) 116, 118, 120, 122 within the energy saving cell 106, which covers a geographical service area (e.g., energy saving service area). Although not shown in FIG. 1A, compensation communication station 108 may also provide wireless communication services to UE devices that are not being served by energy saving cell 106.

Communication stations typically provide several cells, but in the interest of brevity and clarity, communication stations 108 and 112 each provide one cell and the full radio and data processing capacity of communication stations 108 and 112 are applied to the service of the cell they provide. Accordingly, for the example shown in FIGS. 1A and 1B, the available capacity of a cell is equivalent to the available capacity of the communication station that provides the cell. As discussed herein, a communication station includes the equipment such as a station controller and radio head that provides a single cell. Accordingly, a communication station can be configured or adjusted to establish the size and shape of the service area of the cell. Several communication stations are typically interconnected through a backhaul (not shown) to a mobile network (not shown) to provide several service areas to cover large areas. The backhaul may include any combination of wired, optical, and/or wireless communication channels. The mobile network may include routing and processing electronic equipment for connecting communication stations and for transporting data to other networks, such as the Internet or the public telephone network.

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification. In addition, for the examples herein, the network may include 3GPP Core Network functionality of the Mobility Management Entity (MME) and the Packet Gateway (P-GW).

Therefore, for the examples herein, the compensation communication station 108 includes a wireless transceiver that transmits downlink signals to one or more UE devices (not shown in FIGS. 1A and 1B) within the compensation cell 104 in accordance with 3GPP LTE and receives uplink signals from one or more UE devices within the compensation cell 104 in accordance with 3GPP LTE. The energy saving communication station 112 includes a wireless transceiver that transmits downlink signals to the one or more UE devices 116, 118, 120, 122 within the energy saving cell 106 in accordance with 3GPP LTE and receives uplink signals from the one or more UE devices 116, 118, 120, 122 within the energy saving cell 106 in accordance with 3GPP LTE.

The User Equipment (UE) devices 116, 118, 120, 122 may be referred to as mobile devices, wireless devices, wireless communication devices, and mobile wireless devices, and UEs, as well as by other terms. The wireless communication devices include electronics and code for communicating with communication stations (eNBs) and, in some cases, with other devices including other UE devices. The UE devices include devices such as smart phones, cell phones, personal digital assistants (PDAs), wireless modem cards, wireless modems, televisions with wireless communication electronics, and laptop and desktop computers, as well as other devices. The combination of wireless communication electronics with an electronic device, therefore, may form a wireless communication device. For example, a wireless communication device may include a wireless modem connected to an appliance, computer, or television.

In some circumstances, the compensation communication station 108 uses different frequency channels to provide the compensation cell 104 than the energy saving communication station 112 uses to provide the energy saving cell 106. In other circumstances, the compensation communication station 108 and the energy saving communication station 112 use the same frequency channels to provide their respective cells 104 and 106. For the example of FIGS. 1A and 1B, the same set of downlink/uplink frequency channel pairs may be assigned for the compensation cell 104 and the energy saving cell 106. In the cell configurations shown in FIGS. 1A and 1B, communications in the compensation cell 104 interfere with communications in the energy saving cell 106 when the cells overlap since each cell is using the same set of downlink/uplink frequency channel pairs.

In operation, system 100 determines that a coverage transition should be initiated. The coverage transition may be initiated in response to a determination that the energy saving service area 106 should be reduced or deactivated and the compensation service area 104 should be expanded.

Such a determination may be based on any number of several factors and circumstances where some examples include the resource load on the energy saving service area 106 and the compensation service area 104. For example, the resource load of the energy saving service area 106 may at least partly be based on the amount of time and frequency resources being used by all of the UE devices 116, 118, 120, 122 within the service area. The determination for deactivating the energy saving service area 106 may be based on whether the resources allocated to the compensation service area 104 have sufficient available capacity to provide service to one or more of the UE devices 116, 118, 120, 122 within the energy saving service area 106. As another example, the determination for deactivating an energy saving service area 106 may be based on a particular time, day, month, etc., where an operator has determined that the traffic load at this time can be managed without the energy saving service area 106. In response to the determination that the energy saving service area 106 should be reduced or deactivated, the coverage transition is initiated. In other instances, the coverage transition may be initiated merely to reduce the size of and/or energy consumed by the energy saving cell 106 without deactivating the energy saving cell 106.

As used herein, the term "traffic load" generally refers to an amount of communications resources of a particular cell that are being used by the UE devices that are being served by the cell. For the LTE system, communications resource assignments consists of Orthogonal Frequency-Division Multiple Access (OFDMA) resource blocks, which consist of a frequency component, consisting of subchannels, and a time component, consisting of timeslots within time frames and subframes. Traffic load determination considers resource block usage averaged over multiple time frames. Traffic load can be expressed in absolute terms or as a measurement relative to the total resources (e.g., capacity) of the cell or the communication station providing the cell.

Regardless of the criteria used to determine that a coverage transition should be initiated, once the determination is made, according to the invention, the compensation communication station 106 expands the size of the compensation service area 104 to include at least a portion of the energy saving service area 106. In the case that the compensation and energy saving service areas are operating on the same frequency channels, some UE devices being served by the energy saving communication station may lose radio connection with the energy saving communication station due to the interference caused by the expanded compensation service area. In the example shown in FIG. 1A, in the case that the compensation service area 104 would be expanded to include the entirety of the energy saving service area 106, the signal level of the compensation communication station 108 at the edge of the energy saving cell, e.g. the locations of UE devices 116 and 118, may exceed the signal level of the energy saving communication station 112 to an extent that causes UE devices 116 and 118 to lose radio connection with the energy saving communication station 112. According to the invention, a coverage transition is managed by expanding the compensation service area 104 in incremental stages, such that for each expansion increment, the interference from the expanded compensation cell does not cause UE devices 116 and 118 to lose connection with the energy saving communication station 112. After each expansion increment, a set of UE devices 116 and 118 located at the cell-edge of the energy saving cell that are able to detect the expanded compensation cell are handed over to the compensation communication station 108, and after the handover of the set of UE devices 116 and 118, the energy saving communication station 112 reduces the size of the energy saving service area 106. This procedure may be repeated for additional expansion increments required for the coverage transition.

To initiate a coverage transition, the energy saving communication station 112 may transmit a request to the compensation communication station 108 to change the system coverage configuration. The request may include an indication of the UE device load for the UE devices 116, 118, 120, 122 that are being served by the energy saving communication station 112, or may include an indication of the UE device load for the UE devices 116, 118 served by the energy saving communication station 112 that are located within a first cell edge area 124 and are candidates for handover to the compensation communication station 108 during a first stage of a coverage transition. Alternatively, the compensation communication station 108 may already have this information because of previously received traffic load information or it may request the information based on existing methods. The compensation communication station may use this information to determine whether there is enough available capacity of the resources allocated to the compensation service area to accept the coverage expansion request.

In the example shown in FIG. 1A, UE devices 116, 118 are located within a first cell edge area 124 of the energy saving cell and may be identified in the request, and UE devices 120, 122 are not located within the first cell edge area 124. The first cell edge area 124 is an area where the energy saving cell 106 and the compensation cell 104 overlap such that the UE devices 116, 118 that are being served by the energy saving cell 106 can detect signals transmitted from the compensation communication station 108 and are suitable candidates for being handed over to the compensation cell 104. Specific manners of defining the boundaries of the cell edge area are discussed more fully in connection with FIGS. 2A, 2B, 5, and 6 below.

The compensation communication station 108 responds to the request from the energy saving communication station 112 by transmitting either an affirmative or negative response to the energy saving communication station 112. Based at least on the traffic load that the energy saving cell 106 is requesting to handover and the available capacity of the compensation cell 104, the compensation communication station 108 determines whether the compensation cell 104 can serve the UE devices 116, 118, 120, 122 being served by the energy saving communication station 112 if the compensation service area 104 were to be expanded to include the energy saving service area 106. When determining whether the compensation cell 104 can serve UE devices 116, 118, 120, 122, the compensation communication station 108 may take into consideration the amount of the energy saving cell's traffic load that could be transferred to other cells. This information could be obtained from the energy saving communication station 112 or from a centralized traffic management server, or it might be determined by the compensation communication station 108 based on traffic load reports received from other communication stations. In response to a determination that the compensation cell 104 can serve the UE devices 116, 118, 120, 122, being served by the energy saving cell 106, the compensation communication station 108 initiates a transition of the radio coverage area configuration to expand the compensation service area to ultimately include the entirety of the energy saving service area and to ultimately deactivate the energy saving service area. The compensation communication station 108 may determine that the compensation cell 104 can only serve a partial set of the UE devices 116, 118, 120, 122 being served by the energy saving communication station 112, such as a partial set consisting of cell-edge UE devices 116, 118, and consequently, the compensation service area 104 can only be expanded to include a portion of the energy saving service area 106 and the energy saving service area can only be partially reduced.

The coverage area reconfiguration in FIGS. 1A and 1B begins with a first expansion increment of the compensation cell (e.g., compensation coverage area 104) to cover a first portion of the energy saving cell (e.g. energy saving service area 106), which includes the first cell edge area 124. UE devices 116, 118 are then handed over to the compensation communication station 108 and, after the handovers are complete, the size of the energy saving cell 106 is partially reduced by a first portion. FIG. 1B shows the coverage configuration after the first expansion increment. As shown in FIG. 1B, the compensation cell 104' is larger than the compensation cell 104 in FIG. 1A and extends farther away from compensation communication station 108 and closer to energy saving communication station 112 than the compensation cell 104. FIGS. 1A and 1B also show that the coverage area (e.g., energy saving cell 106) of the energy saving communication station 112 has been reduced such that the reduction of coverage area creates a second cell edge area 126 that is closer to the energy saving communication station 112 than the first cell edge area 124. As shown in FIG. 1B, the energy saving cell 106' does not extend as far away from the energy saving communication station 112 as the energy saving cell 106 shown in FIG. 1A. Once all of the UE devices 116, 118 located in the first cell edge area 124 have been handed over to the compensation communication station 108 (e.g. or to other communication stations), and the energy saving service area has been reduced, the energy saving communication station 112 may transmit an update message to the compensation communication station 108 that the first stage of the coverage transition is complete.

At this point, if it had been determined that additional one or more UE devices being served by the energy saving communication station 112 can be served by the compensation communication station 108, the coverage area (e.g., compensation cell 104') of the compensation communication station 108 is expanded to cover the second cell edge area 126, and the additional one or more UE devices (e.g., UE devices 120,122) located in the second cell edge area 126 are handed over from the energy saving communication station 112 to the compensation communication station 108. After handing over UE devices 120, 122, the coverage area (e.g., energy saving cell 106') of the energy saving communication station 112 is further reduced. Once all of the UE devices 120, 122 located in the second cell edge area 126 have been handed over to the compensation communication station 108 (e.g. or to other communication stations), and the energy saving service area has been reduced, the energy saving communication station 112 may transmit an update message to the compensation communication station 108 that the second stage of the coverage transition is complete.

In the example shown in FIGS. 1A and 1B, the coverage area configuration transition consists of two stages of incrementally expanding the compensation cell 104, handing over different sets of UE devices in conjunction with each incremental expansion of the compensation cell 104, and reducing the energy saving cell 106, accordingly. However, there could be more stages utilized to incrementally increase the coverage area of the compensation cell 104 and decrease the coverage area of the energy saving cell 106. When the coverage area configuration transition involves deactivating the energy saving cell 106, the number of coverage transition stages performed is that which is required to handover all of the UE devices being served by the energy saving cell 106. More specifically, all of the UE devices being served by the energy saving cell 106 are handed over to one or more compensation cells (or neighboring cells that do not expand their coverage area) before the energy saving cell 106 is deactivated or switched off.

However, in other instances, the energy saving cell's activity may only be partially reduced and a compensation service area may be expanded to include only a part of the energy saving service area. For example, the energy saving cell may hand over one or more UE devices and still continue to serve one or more remaining UE devices. When the coverage area configuration transition involves only reducing size of the energy saving cell 106, the number of coverage transition stages performed is that which adds the amount of load that is allowed by the traffic load of the compensation communication station.

Figure 2A:
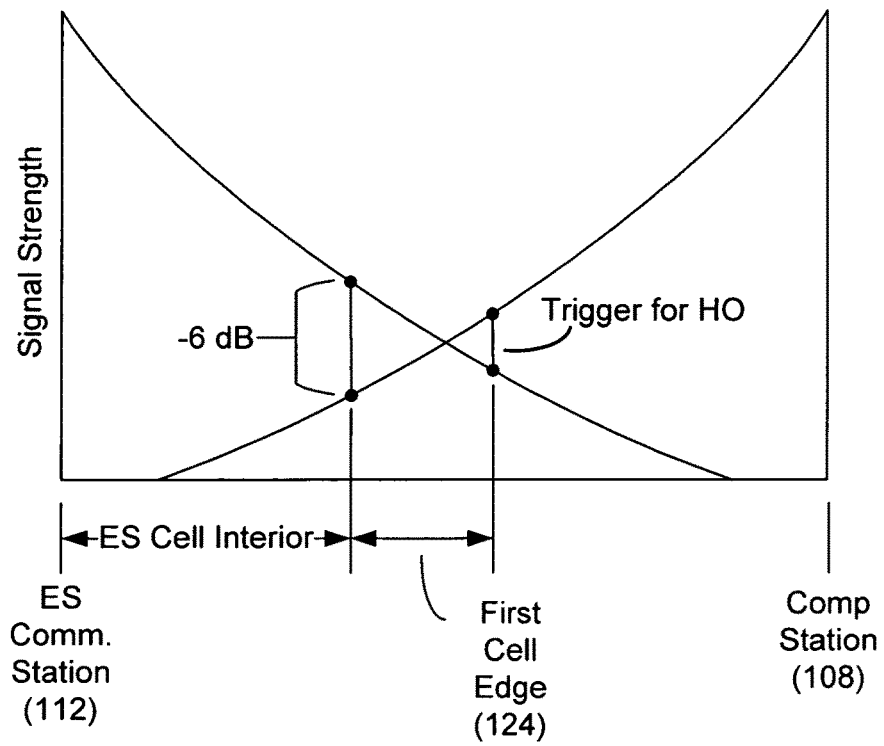
FIG. 2A is a graphical representation of the signal strength of an energy saving cell and a compensation cell as a function of distance from an energy saving communication station and a compensation communication station before the compensation cell is expanded.

FIG. 2A is a graphical representation of the signal strength of an energy saving cell 106 and a compensation cell 104 as a function of distance from an energy saving communication station 112 and a compensation communication station 108 before the compensation cell 104 is expanded. More specifically, the vertical axis of the graph in FIG. 2A represents signal strength, and the horizontal axis represents location relative to the energy saving communication station 112 and the compensation communication station 108. Thus, the graph of FIG. 2A shows a high level of signal strength from the energy saving communication station 112 at a point close to the energy saving communication station 112 on the far left portion of the graph. However, the signal strength from the energy saving communication station 112 decreases as the distance from the energy saving communication station 112 increases (e.g., moving toward the right side of the graph). Similarly, the graph of FIG. 2A shows a high level of signal strength from the compensation communication station 108 at a point close to the compensation communication station 108 on the far right portion of the graph. However, the signal strength from the compensation communication station 108 decreases as the distance from the compensation communication station 108 increases (e.g., moving toward the left side of the graph).

The energy saving communication station 112 is meant to handover UE devices that are located within the cell-edge region of the energy saving cell. The energy saving communication station 112 can determine which UE devices are within this region by providing UE devices with measurement requests that include a trigger based on the difference in signal strength between the energy saving communication station and the compensation communication station, according to the LTE specifications. When a UE device determines that the difference in the signal strengths is equal to the threshold, the UE device sends a measurement report to the energy saving communication station, which serves as a notification that the UE device has entered the cell-edge region. UE devices that are within the cell-edge region of the energy saving cell may be handed over to the compensation cell during coverage transition procedures.

As can be seen in FIG. 2A, the first cell edge area 124 has an inner boundary that is located at a first point where the difference between the signal strength of the energy saving communication station 112 and the signal strength of the compensation communication station 108 is equal to a first threshold level. In the example shown, the first threshold level is a 6 dB difference between the signal strength of the energy saving communication station 112 and the signal strength of the compensation communication station 108. However, as described in more detail below, other values may be used instead of the 6 dB value for the first threshold value.

The first cell edge area 124 has an outer boundary at a second point farther away from the energy saving communication station 112 than the first point. In the example shown in FIG. 2A, the second point is the point where the difference between the signal strength of the compensation communication station 108 and the signal strength from the energy saving communication station 112 is equal to a second threshold level. In other instances, the second point could be the point where the signal strength of the compensation communication station 108 and the signal strength of the energy saving communication station 112 are approximately equal.

Figure 2B:
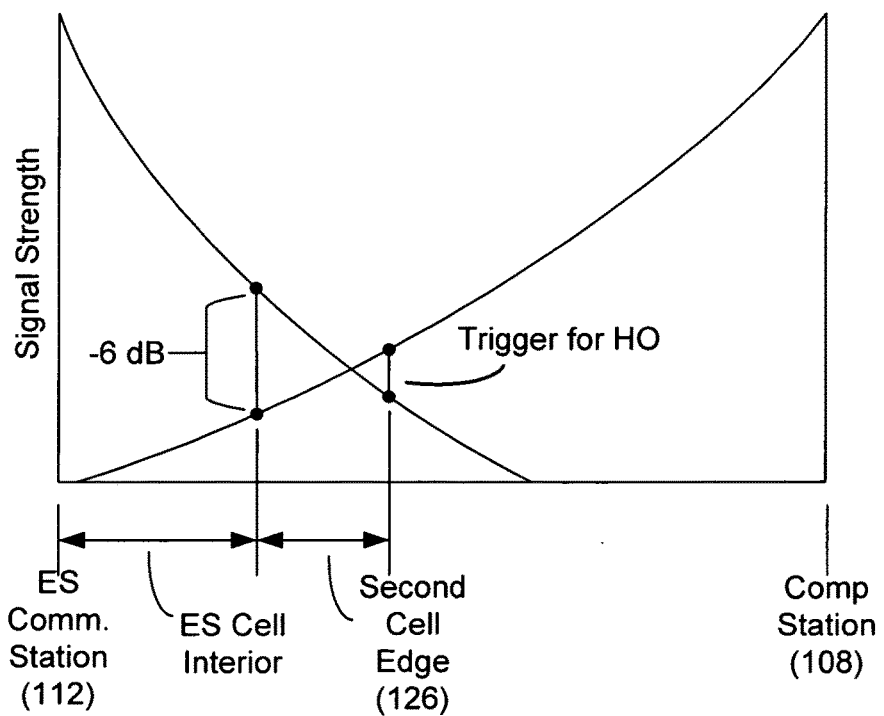
FIG. 2B is a graphical representation of the signal strength of an energy saving cell and a compensation cell as a function of distance from an energy saving communication station and a compensation communication station after the compensation cell is expanded by an increment.

FIG. 2B is a graphical representation of the signal strength of the energy saving cell 106 and the compensation cell 104 as a function of distance from the energy saving communication station 112 and the compensation communication station 108 after the compensation cell 104 is expanded. As can be seen, the coverage area (e.g., energy saving cell 106) of the energy saving communication station 112 has been reduced such that the reduction of coverage area creates a second cell edge area 126 that is closer to the energy saving communication station 112 than the first cell edge area 124. As described above, the coverage area (e.g., compensation cell 104') of the compensation communication station 108 has also been incrementally expanded farther away from compensation communication station 108 and closer to energy saving communication station 112. FIG. 2B illustrates a second stage of the coverage transition procedure. Since the compensation service area has been expanded and the energy saving service area has been reduced, the cell edge of the energy saving service area has moved closer to the energy saving communication station. As described in connection with FIG. 2A, the energy saving communication station receives measurement reports from UE devices, which allows it to determine which UE devices are within the second cell-edge area of the energy saving cell so that these UE devices may be handed over to the compensation communication station.

Figure 3A:
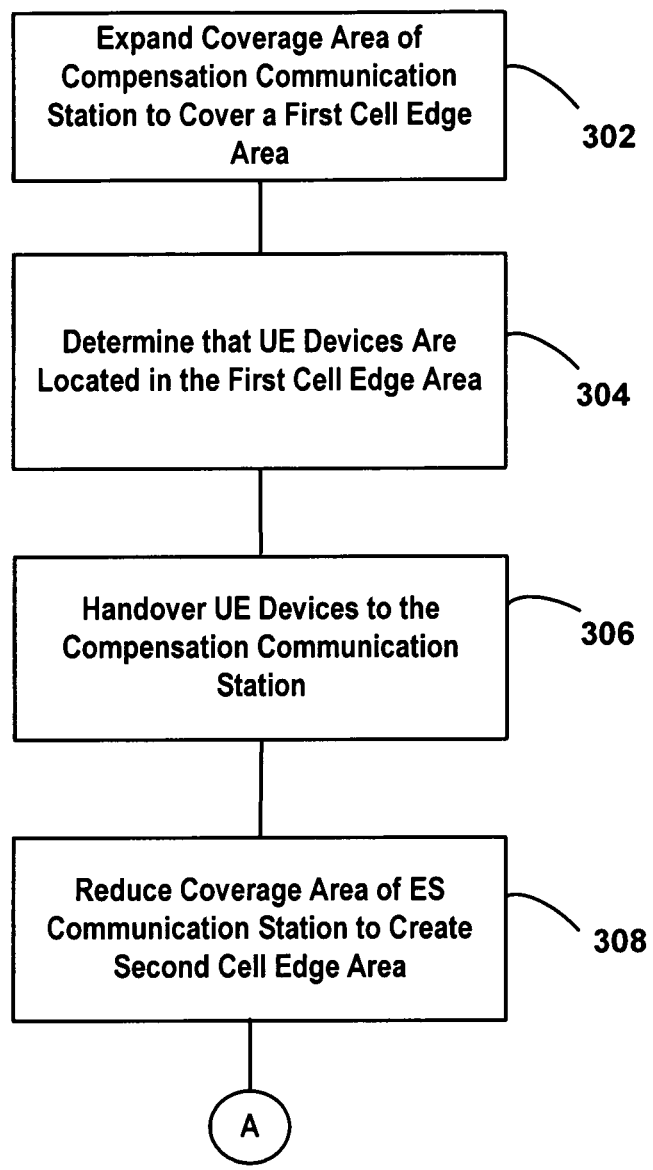
FIG. 3A is a partial flowchart showing a method of operating the system shown in FIGS. 1A and 1B according to the invention.
Figure 3B:
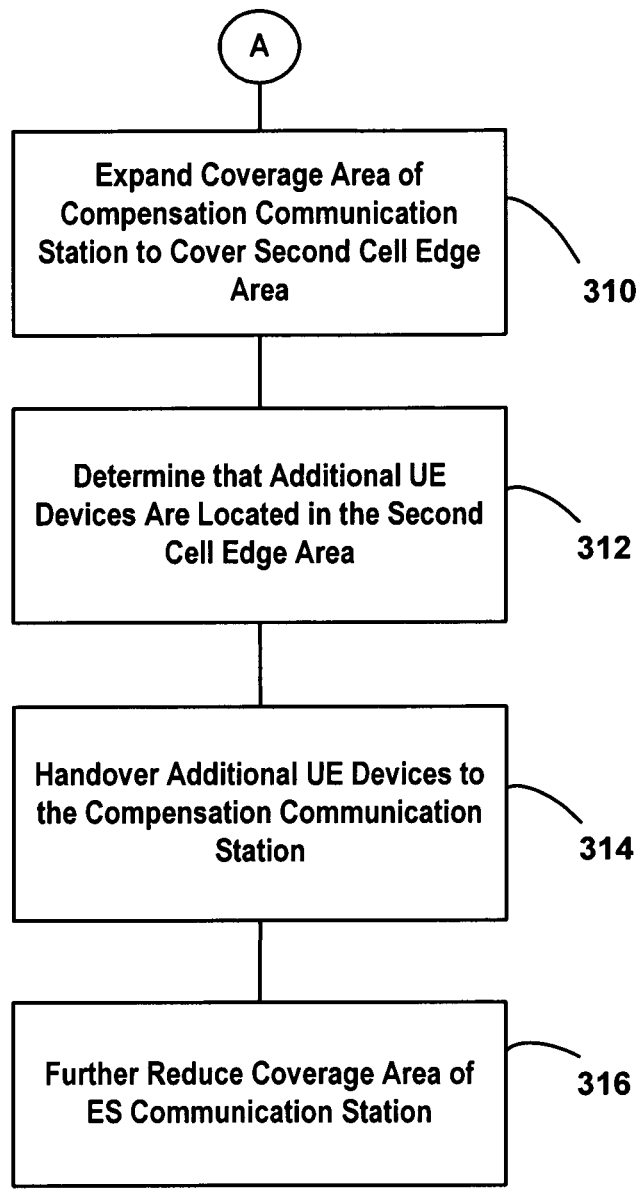
FIG. 3B is a continuation of the flowchart shown in FIG. 3A.

FIGS. 3A and 3B show a flowchart of a method of operating the system shown in FIGS. 1A and 1B. The method begins at step 302, in which the coverage area (e.g., compensation cell 104) of the compensation communication station 108 is expanded to cover a first cell edge area 124. At step 304, the system 100 determines that one or more UE devices being served by the energy saving communication station 112 are located in the first cell edge area 124. As described above, this determination can include determining whether a difference between the signal strength of the energy saving communication station 112 and the signal strength of the compensation communication station 108 is equal to or less than a first threshold level. In some instances, the determination of whether one or more UE devices being served by the energy saving communication station 112 are located in the first cell edge area 124 is made by a controller in the energy saving communication station 112. The controller in the energy saving communication station 112 may be configured to perform any of the steps, techniques, and methods described herein.

At step 306, the UE devices located in the first cell edge area 124 are handed over from the energy saving communication station 112 to the compensation communication station 108. At step 308, the coverage area (e.g., energy saving cell 106) of the energy saving communication station 112 is reduced such that the reduction of coverage area creates a second cell edge area 126 that is closer to the energy saving communication station 112 than the first cell edge area 124. The boundaries of the first cell edge area 124 and the second cell edge area 126 may be selected in different manners, as described above.

At step 310, the coverage area (e.g., compensation cell 104') of the compensation communication station 108 is expanded to cover the second cell edge area 126. At step 312, the energy saving communication station determines the UE devices that are located in a second cell edge area. At step 314, the UE devices located in the second cell edge area 126 are handed over from the energy saving communication station 112 to the compensation communication station 108. After handing over the UE devices, the coverage area (e.g., energy saving cell 106') of the energy saving communication station 112 is further reduced, at step 316.

The method described in connection with FIGS. 3A and 3B involves a coverage area configuration transition that consists of two steps of incrementally expanding the compensation cell 104, handing over different sets of UE devices in conjunction with each incremental expansion of the compensation cell 104, and reducing the energy saving cell 106, accordingly. However, there could be more stages utilized to incrementally increase the coverage area of the compensation cell 104 and decrease the coverage area of the energy saving cell 106. When the coverage area configuration transition involves deactivating the energy saving cell 106, the number of coverage transition stages performed is that which is required to handover all of the UE devices being served by the energy saving cell 106. More specifically, all of the UE devices being served by the energy saving cell 106 are handed over to one or more compensation cells (or neighboring cells that do not expand their coverage area) before the energy saving cell 106 is deactivated.

Figure 4:
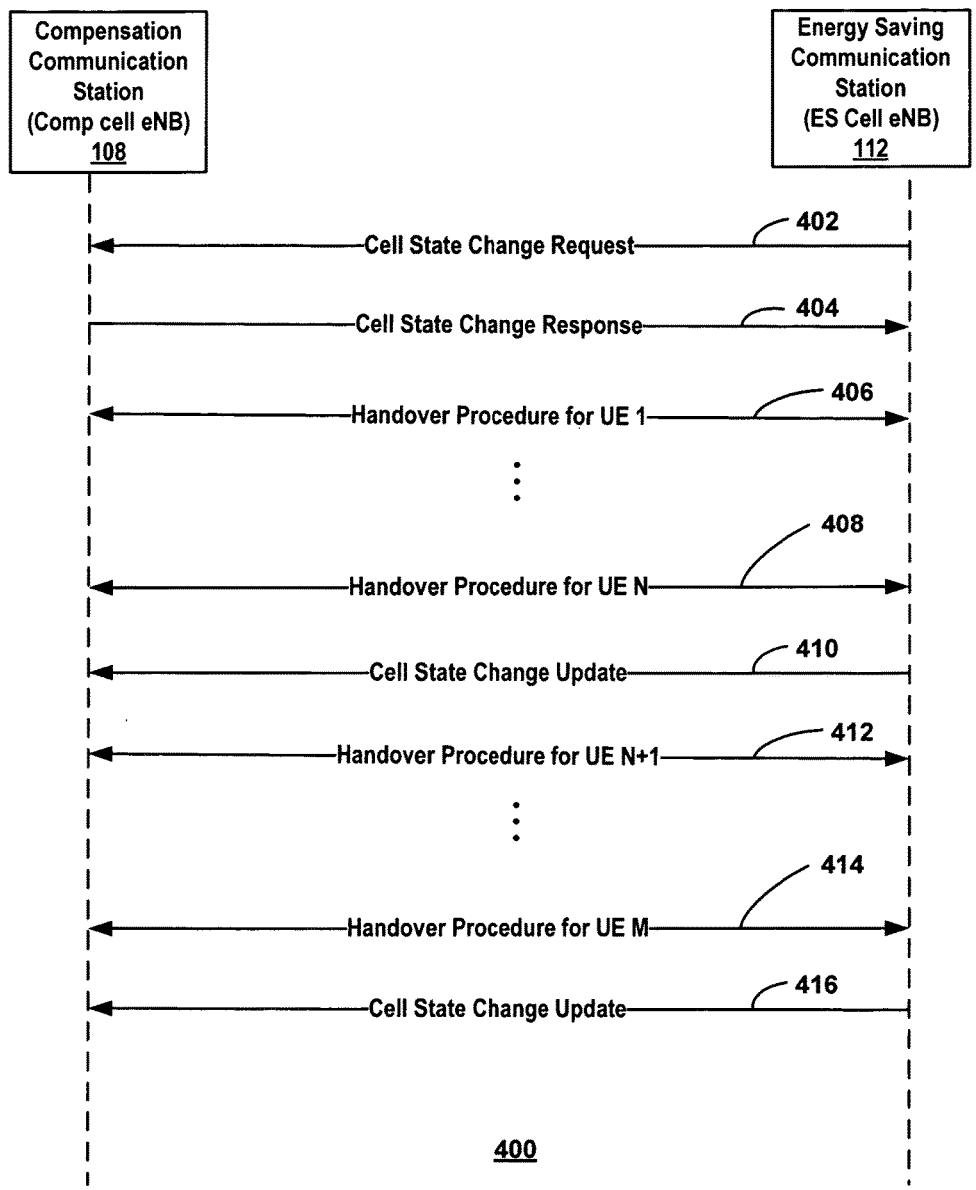
FIG. 4 is a message flow diagram between the compensation communication station and the energy saving communication station of FIGS. 1A and 1B.

FIG. 4 is a message flow diagram 400 between the compensation communication station 108 and the energy saving communication station 112. For the example, the communication stations are eNBs that communicate through the backhaul over an X2 link in accordance with LTE communication standards. Other communication techniques can be used in some circumstances. More specifically, the communication stations could communicate wirelessly in some circumstances.

For the example shown in FIG. 4, in response to determining that a coverage transition should be initiated, the energy saving communication station (ES cell eNB) 112 may send a request 402 to the compensation communication station 108 to initiate a transition of the cell coverage configuration. In the example shown in FIG. 4, this request is a Cell State Change Request message 402. The request may also include an indication of the UE device traffic load for the UE devices 116, 118, 120, 122 that are being served by the energy saving communication station 112, or may include an indication of the UE device load for the UE devices 116, 118 that are located within a first cell edge area 124 and are candidates for handover to the compensation communication station 108 during a first stage of a coverage transition. Alternatively, the compensation communication station 108 may already have this information because of previously received traffic load information or it may request the information based on existing methods.

Based at least on the traffic load of the UE devices being served by the energy saving communication station or of the UE devices located in the first cell edge area 124 and the available capacity of the compensation cell 104, the controller of the compensation communication station 108 determines whether the compensation cell 104 can serve these UE devices. If it is determined that the compensation communication station 108 can serve these UE devices, l the compensation communication station 108 sends a response to the request. In this example, the response is a Cell State Change Response message 404. The Cell State Change Response message 404 indicates to the energy saving communication station 112 that UE devices can be handed over to the compensation cell 104 and that a coverage transition can be performed.

In one example, the Cell State Change messages 402/404 are part of a dedicated procedure for this feature that is added to a standard specification. In other circumstances, the Cell State Change messages 402/404 functions may be incorporated into messaging structures and procedures currently defined by a communication standard, such as the Load Management or eNB Configuration Update procedures contained in the LTE communication standard. In either case, modifications of the LTE communication standard can facilitate the communication.

Although not shown in FIG. 4, the energy saving communication station 112 may transmit an eNB Configuration Update to notify other eNBs that a configuration update is being requested or is about to take place. This eNB Configuration Update may be sent before, concurrently with, or after the energy saving communication station 112 transmits the Cell State Change Request message 402. Alternatively, the compensation communication station 108 may transmit this eNB Configuration Update before, concurrently with, or after the compensation communication station 108 transmits the Cell State Change Response message 404.

A part of the transition of the cell coverage configuration is that the compensation cell is reconfigured such that its coverage area is incrementally expanded and the first expansion increment includes the first cell edge area being served by the energy saving cell, and the coverage area of the energy saving cell 106 is reduced such that the reduction creates a second cell edge area that is closer to the energy saving communication station than the first cell edge area. The expansion of the compensation service area is initiated by the compensation communication station 108 after transmitting the Cell State Change Response message 404 with an indication that the compensation communication station 108 accepts the request for a transition of the cell coverage configuration. For the first expansion increment, the compensation communication station 108 increases transmission power and performs other known techniques for expanding the compensation service area to cover the first cell edge area. For example, techniques such as antenna tilting and antenna beam forming may be used to provide an expanded service area of the compensation cell that covers the first cell edge area as well as the original service area of the compensation service area. Although not shown in FIG. 4, after the compensation service area has been expanded to the extent of the first expansion increment, the compensation communication station may send a Cell State Change Update message to the energy saving communication station, with an indication that compensation service area expansion is complete and so handover procedures may begin.

The energy saving communication station may change the handover trigger for the first set of UE devices 116, 118 (e.g., located in the first cell edge area 124) so that they are handed over from the energy saving cell 106 to other cells according to the typical LTE handover procedures. A UE device may be handed over to the compensation cell 104 when the compensation cell's coverage of the energy saving service area allows it to be a suitable handover target for the UE. As illustrated in FIG. 4, handover messages 406 for the first UE device are exchanged between the communication stations 108, 112 and handover messages 408 for the nth UE device are exchanged between the communication stations 108, 112. When all of the first set of UE devices (e.g., UE 1-UE n) are handed over, the energy saving communication station 112 may reduce the energy saving service area and send an update message 410 to the compensation communication station 108 indicating that the first set of UE device handovers is complete. In the example shown in FIG. 4, this update is a Cell State Change Update message 410. In other instances not illustrated in FIG. 4, if it was previously only determined that the compensation communication station could serve the UE devices that were located in the first cell edge area, the energy saving communication station may send a Cell State Change Request message to the compensation communication station that includes an indication of the UE device traffic load for UE devices that are located in the second cell edge area and the compensation communication station may respond with a Cell State Change Response message with an indication of acceptance or rejection of another coverage transition stage.

If it is determined that the compensation communication station 108 can serve the UE devices located in the second cell edge area 126, the compensation communication station 108 may expand the coverage of the compensation service area by another expansion increment to cover the second cell edge area and may send a Cell State Change Update message (not shown in FIG. 4) to the energy saving communication station, with an indication that the second stage compensation service area expansion is complete and so handover procedures may begin. At this point in the procedure, the second set of UE devices (e.g., located in the second cell edge area 126) are handed over from the energy saving cell 106 to other cells according to the typical LTE handover procedures. A UE device may be handed over to the compensation cell 104 when the compensation cell's coverage of the energy saving service area allows it to be a suitable handover target for the UE. As illustrated in FIG. 4, handover messages 412 for the first UE device of the second set of UE devices (e.g., UE n+1) are exchanged between the communication stations 108, 112, and handover messages 414 for the mth UE device are exchanged between the communication stations 108, 112. When all of the second set of UE devices (e.g., UE n+1-UE m) are handed over, the energy saving communication station 112 reduces the energy saving service area and sends an update 416 to the compensation communication station 108 indicating that the second set of UE device handovers is complete. In the example shown in FIG. 4, this update is a Cell State Change Update 416.

The method described in connection with FIG. 4 involves a coverage area configuration transition that consists of two stages of incrementally expanding the compensation cell 104, handing over different sets of UE devices in conjunction with each incremental expansion of the compensation cell 104, and reducing the energy saving cell 106, accordingly. However, there could be more stages utilized to incrementally increase the coverage area of the compensation cell 104 and decrease the coverage area of the energy saving cell 106 according to the available capacity of the compensation communication station.

Upon completion of the coverage transition, the energy saving service area 106 may be deactivated if all of its UE devices have been handed over to other communication stations. As discussed herein, a service area is "deactivated" when it no longer transmits downlink signals to UE devices and does not receive or process uplink signals from UE devices. Therefore, a deactivated service area cannot provide wireless service to UE devices. The communication station that provides the energy saving service area still includes active functions and is not turned off. For example, the communication station is still capable of communicating with other communication stations and/or the network.

In some circumstances, a communication station configuration update message may be sent from the energy saving communication station 112 to other communications stations indicating that the configuration transition is complete, that the energy saving service area is no longer active, or that the energy saving service area has been reduced. The other communication stations include at least the neighbor stations of the energy saving service area and may include other communication stations that require information regarding the status of the energy saving service area. For example, this functionality could be added to the LTE X2 interface eNB Configuration Update message that communication stations use to notify other communication stations about configuration changes of their service areas (cells).

Also, in some circumstances, a communication station configuration update message may be sent from the compensation communication station 108 to the other communications stations indicating that the compensation service area has been expanded as well as the extent of the expansion. The other communication stations include at least the neighbor stations of the compensation service area and may include other communication stations that require information regarding the status of the compensation service area. For example, this functionality could be added to the LTE X2 interface eNB Configuration Update message that communication stations use to notify other communication stations about configuration changes of their service areas.

Figure 5:
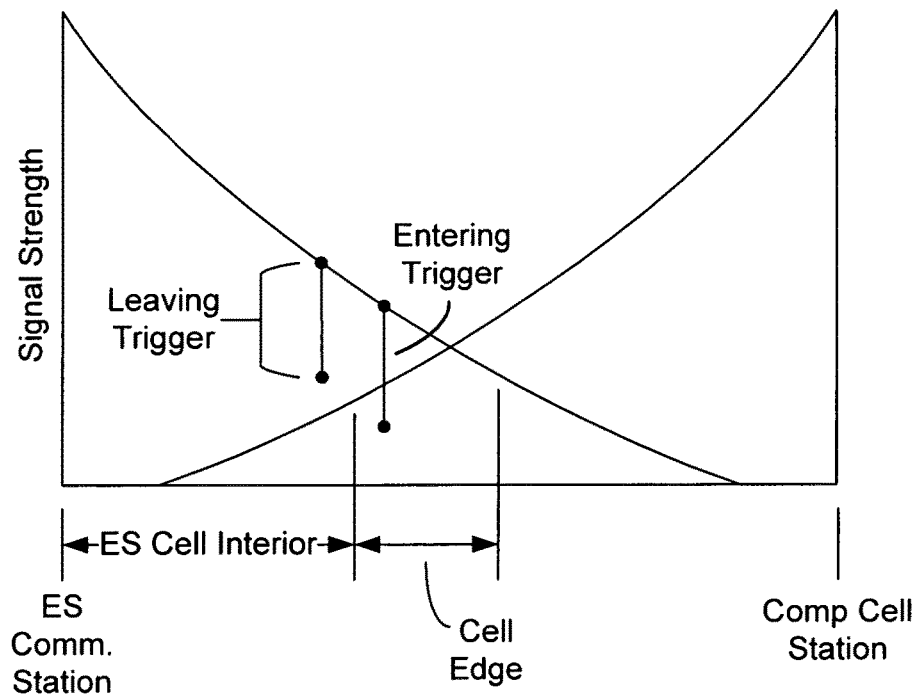
FIG. 5 is a graphical representation of the signal strength of an energy saving cell and a compensation cell as a function of distance from an energy saving communication station and a compensation communication station that can be used to determine whether a user equipment device is entering or leaving the cell edge area.

FIG. 5 is a graphical representation of the signal strength of an energy saving cell and a compensation cell as a function of distance from an energy saving communication station and a compensation communication station that can be used to determine whether a user equipment device is entering or leaving the cell edge area. For example, a determination can be made that a UE device has entered the cell edge area from the interior of the energy saving cell when an entering trigger is observed and the UE device sends a measurement report to the energy saving communication station. More specifically, when the difference between the signal strength of a signal from the energy saving communication station and a signal from the compensation communication station is equal to or less than the entering threshold, it triggers the UE device to send a measurement report to the energy saving communication station. In some circumstances, the entering threshold is equal to the negative of an offset value minus a hysteresis value. The energy saving communication station uses the measurement report from the UE device to know whether the UE device should be handed over to the compensation communication station during a coverage transition procedure.

After the entering trigger has been detected by a UE device, when the difference between the signal strength of a signal from the energy saving communication station and a signal from the compensation communication station is equal to or greater than the leaving threshold, it triggers the UE device to send a measurement report to the energy saving communication station indicating that the UE device has left the cell edge area. In some circumstances, the leaving threshold is equal to the negative of an offset value plus a hysteresis value.

Figure 6:
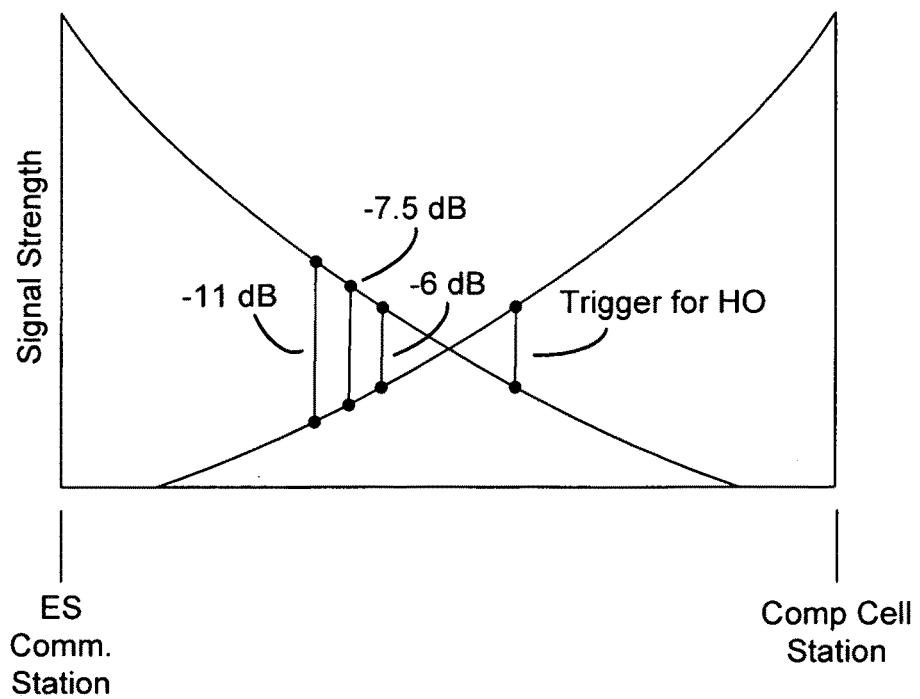
FIG. 6 is a graphical representation of the signal strength of an energy saving cell and a compensation cell as a function of distance from an energy saving communication station and a compensation communication station that illustrates how the inner boundary of the cell edge area can be dependent on the ability of a UE device to detect the signal from the compensation communication station.

FIG. 6 is a graphical representation of the signal strength of an energy saving cell and a compensation cell as a function of distance from an energy saving communication station and a compensation communication station that shows how the inner boundary of the cell edge area can be adjusted based on the ability of a UE device to detect the signal from the compensation communication station. For example, as mentioned above in connection with FIG. 2A, the first cell edge area 124 has an inner boundary that is located at a first point where the difference between the signal strength of the energy saving communication station 112 and the signal strength of the compensation communication station 108 is equal to a first threshold level. In the example shown in FIG. 2A, the first threshold level is a 6 dB difference between the signal strength of the energy saving communication station 112 and the signal strength of the compensation communication station 108.

However, other values may be used instead of the 6 dB value for the first threshold value. For example, UE devices of later releases of 3GPP LTE may be able to detect signals from the compensation communication station 108 where the difference between the signal strength of the energy saving communication station 112 and the signal strength of the compensation communication station 108 is larger. As shown in FIG. 6, the difference of 7.5 dB and/or 11 dB may be used as the first threshold value, depending on the capabilities of the UE devices. Of course, other threshold values may be used besides those shown in FIG. 6, so long as the UE devices could detect the compensation cell and determine the difference in the signal strengths. Tailoring the handover thresholds for different UE devices according to their capabilities can shorten the time for the coverage transition since more UE devices may be handed over at each stage.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   expanding a coverage area of a compensation communication station to cover a first cell edge area;
   determining that one or more user equipment devices (UE devices) being served by an energy saving communication station are located in the first cell edge area;
   handing over the one or more UE devices located in the first cell edge area from the energy saving communication station to the compensation communication station;
   reducing a coverage area of the energy saving communication station such that the reduction of coverage area creates a second cell edge area that is closer to the energy saving communication station than the first cell edge area;
   expanding the coverage area of the compensation communication station to cover the second cell edge area;

determining that an additional one or more UE devices being served by the energy saving communication station are located in the second cell edge area;

handing over the additional one or more UE devices located in the second cell edge area from the energy saving communication station to the compensation communication station; and after handing over the additional one or more UE devices, further reducing the coverage area of the energy saving communication station.

2. The method of claim 1, wherein determining that one or more UE devices being served by the energy saving communication station are located in the first cell edge area comprises:

determining that a difference between a signal strength of the energy saving communication station and a signal strength of the compensation communication station is equal to or less than a first threshold level.

3. The method of claim 1, wherein determining that one or more UE devices being served by the energy saving communication station are located in the first cell edge area comprises:

determining that one or more UE devices have entered the first cell edge area.

4. The method of claim 3, wherein determining that one or more UE devices being served by the energy saving communication station are located in the first cell edge area further comprises:

determining that one or more UE devices have left the first cell edge area.

5. The method of claim 1, wherein the first cell edge area is defined by a first point where a difference between a signal strength of the energy saving communication station and a signal strength of the compensation communication station is equal to a first threshold level, and a second point farther away from the energy saving communication station than the first point.

6. The method of claim 5, wherein the second point comprises:

a point where the signal strength of the compensation communication station and the signal strength of the energy saving communication station are approximately equal.

7. The method of claim 5, wherein the second point comprises:

a point where a difference between the signal strength of the compensation communication station and the signal from the energy saving communication station is equal to a second threshold level.

8. An energy saving communication station comprising:
a transmitter configured to transmit a coverage transition request to a compensation communication station;
a receiver configured to receive a response to the coverage transition request from the compensation communication station; and
a controller configured to:
in response to receiving an affirmative response to the coverage transition request from the compensation communication station, handover one or more user equipment devices (UE devices) located in a first cell edge area to the compensation communication station,
reduce a coverage area of the energy saving communication station such that the reduction of coverage area creates a second cell edge area that is closer to the energy saving communication station than the first cell edge area,
handover an additional one or more UE devices located in the second cell edge area to the compensation communication station, and
after handing over the additional one or more UE devices, further reduce the coverage area of the energy saving communication station.

9. The energy saving communication station of claim 8, wherein the controller is further configured to determine whether the one or more UE devices are located in the first cell edge area.

10. The energy saving communication station of claim 9, wherein the controller is further configured to determine whether a difference between a signal strength of the energy saving communication station and a signal strength of the compensation communication station is equal to or less than a first threshold level.

11. The energy saving communication station of claim 9, wherein the controller is further configured to determine whether the one or more UE devices have entered the first cell edge area.

12. The energy saving communication station of claim 11, wherein the controller is further configured to determine whether the one or more UE devices have left the first cell edge area.

13. The energy saving communication station of claim 8, wherein the first cell edge area is defined by a first point where a difference between a signal strength of the energy saving communication station and a signal strength of the compensation communication station is equal to a first threshold level, and a second point farther away from the energy saving communication station than the first point.

14. A system comprising:
a compensation communication station; and
an energy saving communication station comprising:
a transmitter configured to transmit a coverage transition request to the compensation communication station,
a receiver configured to receive a response to the coverage transition request from the compensation communication station, and
a controller configured to:
in response to receiving an affirmative response to the coverage transition request from the compensation communication station, handover one or more user equipment devices (UE devices) located in a first cell edge area to the compensation communication station,
reduce a coverage area of the energy saving communication station such that the reduction of coverage area creates a second cell edge area that is closer to the energy saving communication station than the first cell edge area,
handover an additional one or more UE devices located in the second cell edge area to the compensation communication station, and
after handing over the additional one or more UE devices, further reduce the coverage area of the energy saving communication station.

15. The system of claim 14, wherein the controller is further configured to determine whether the one or more UE devices are located in the first cell edge area.

16. The system of claim 15, wherein the controller is further configured to determine whether a difference between a signal strength of the energy saving communication station and a signal strength of the compensation communication station is equal to or less than a first threshold level.

17. The system of claim 15, wherein the controller is further configured to determine whether the one or more UE devices have entered the first cell edge area.

18. The system of claim 17, wherein the controller is further configured to determine whether the one or more UE devices have left the first cell edge area.

19. The system of claim 14, wherein the first cell edge area is defined by
- a first point where a difference between a signal strength of the energy saving communication station and a signal strength of the compensation communication station is equal to a first threshold level, and
- a second point farther away from the energy saving communication station than the first point.

* * * * *